(12) United States Patent
Wang

(10) Patent No.: US 11,325,141 B2
(45) Date of Patent: May 10, 2022

(54) SPRAY NOZZLE AND SPRAYER

(71) Applicant: INTRADIN (SHANGHAI) MACHINERY CO., LTD., Shanghai (CN)

(72) Inventor: Gaofeng Wang, Shanghai (CN)

(73) Assignee: INTRADIN (SHANGHAI) MACHINERY CO., LTD., Shanghai (CN)

( * ) Notice: Subject to any disclaimer, the term of this patent is extended or adjusted under 35 U.S.C. 154(b) by 0 days.

(21) Appl. No.: 16/999,847

(22) Filed: Aug. 21, 2020

(65) Prior Publication Data

US 2022/0032328 A1 Feb. 3, 2022

(30) Foreign Application Priority Data

Jul. 28, 2020 (CN) .......................... 202010740211.4

(51) Int. Cl.
*B05B 7/00* (2006.01)
*A01M 7/00* (2006.01)

(52) U.S. Cl.
CPC ........... *B05B 7/0075* (2013.01); *A01M 7/006* (2013.01); *A01M 7/0017* (2013.01)

(58) Field of Classification Search
CPC ..... B05B 7/045; B05B 7/0466; B05B 7/0075; B05B 3/105; B05B 3/1092
See application file for complete search history.

(56) References Cited

U.S. PATENT DOCUMENTS

| | | | | |
|---|---|---|---|---|
| 2,607,574 | A * | 8/1952 | Hession, Jr. | ........ B01F 3/04035 261/90 |
| 4,190,207 | A * | 2/1980 | Fienhold | ................... B05B 1/18 239/381 |
| 4,270,698 | A * | 6/1981 | Bisa | ..................... B01F 3/04007 239/171 |
| 4,473,188 | A * | 9/1984 | Ballu | ...................... B05B 14/00 239/121 |
| 4,795,095 | A * | 1/1989 | Shepard | .................. B05B 3/105 239/214.17 |
| 9,375,734 | B1 * | 6/2016 | van der Steur | ....... B05B 3/1035 |
| 9,878,337 | B1 * | 1/2018 | Hong | ...................... B05B 15/40 |
| 10,632,413 | B2 * | 4/2020 | Yin | ..................... B01F 3/04028 |
| 2002/0148909 | A1 | 10/2002 | Junkel | |
| 2006/0208102 | A1 * | 9/2006 | Nolte | .................... B05B 5/0415 239/224 |
| 2008/0047591 | A1 * | 2/2008 | Seitz | ..................... B05B 15/555 134/38 |

(Continued)

FOREIGN PATENT DOCUMENTS

CN 107552256 B 8/2019
CN 111282184 A 6/2020

*Primary Examiner* — Joseph A Greenlund

(57) ABSTRACT

A spray nozzle includes a transmission component and a fan blade assembly. The fan blade assembly is connected to the transmission component, and can rotate with respect to the transmission component to create a vacuum inside the fan blade assembly, so that the liquid to be atomized under atmospheric pressure can enter the fan blade assembly through the transmission component. The fan blade assembly can also drive the liquid in the fan blade assembly to rotate so as to atomize the liquid and eject it from the fan blade assembly. The liquid in the fan blade assembly rotates with the fan blade assembly. A sprayer includes a body and the spray nozzle.

7 Claims, 10 Drawing Sheets

(56) References Cited

U.S. PATENT DOCUMENTS

| | | | | |
|---|---|---|---|---|
| 2011/0000978 A1* | 1/2011 | Chichep-Ortiche | ...... | F03D 9/00 |
| | | | | 239/222.11 |
| 2011/0036926 A1* | 2/2011 | Nunes | ................... | A01K 13/003 |
| | | | | 239/214 |
| 2011/0089258 A1* | 4/2011 | Pun | ........................... | B05B 3/10 |
| | | | | 239/214.23 |
| 2015/0258555 A1* | 9/2015 | Peterson | ............... | B05B 13/005 |
| | | | | 239/7 |
| 2016/0121356 A1* | 5/2016 | Ballu | ........................ | B05B 1/28 |
| | | | | 239/106 |
| 2016/0332174 A1* | 11/2016 | Leslie | ................... | B05B 9/0894 |
| 2018/0160670 A1* | 6/2018 | Pellenc | ................. | B05B 7/0475 |
| 2018/0168140 A1* | 6/2018 | Pellenc | ................. | B05B 7/0815 |
| 2018/0339258 A1* | 11/2018 | Jeon | ..................... | B01D 47/085 |
| 2019/0176171 A1* | 6/2019 | Hen | ........................... | A61L 9/14 |

* cited by examiner

SPRAY NOZZLE AND SPRAYER

CROSS-REFERENCE TO RELATED APPLICATIONS

This application claims the benefit of priority from Chinese Patent Application No. 202010740211.4, filed on Jul. 28, 2019. The content of the aforementioned application, including any intervening amendments thereto, is incorporated herein by reference in its entirety.

TECHNICAL FIELD

This application relates to agricultural field, and more particularly to a spray nozzle and a sprayer.

BACKGROUND

A spray nozzle usually atomizes a liquid by directly ejecting it from the nozzle, during which full contact of the liquid with an inner wall of the nozzle is not allowed. This causes uneven distribution of the liquid in the spray nozzle and thus leads to unsatisfactory liquid atomization, failing to meet the needs of users.

SUMMARY

Given the above, the present application aims to provide a spray nozzle and sprayer with better liquid atomization.

The technical solutions of the present application are described as follows.

Figure 9:
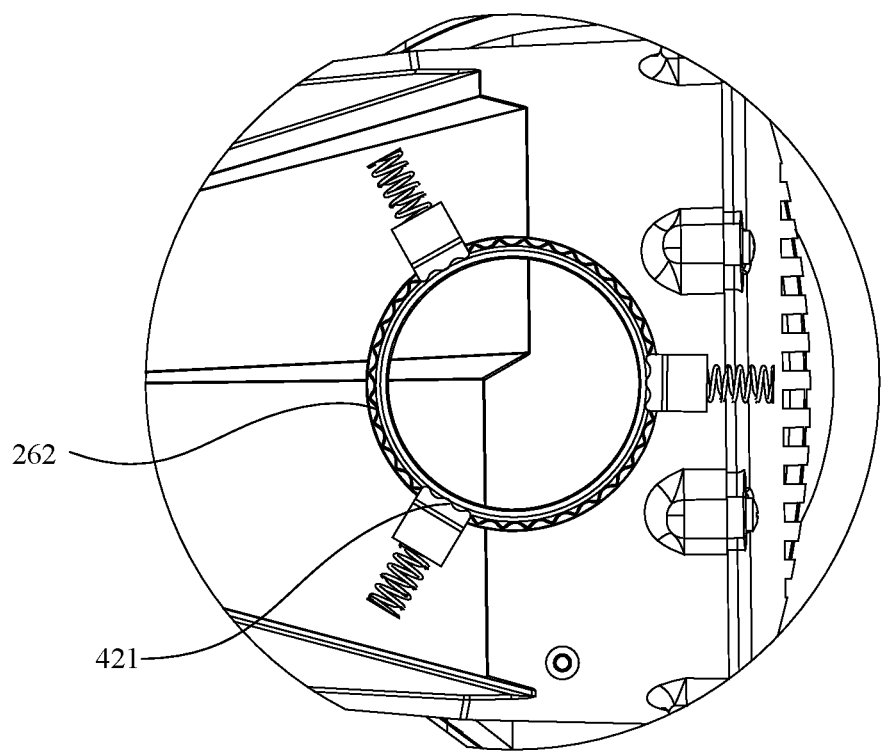
Figure 10:
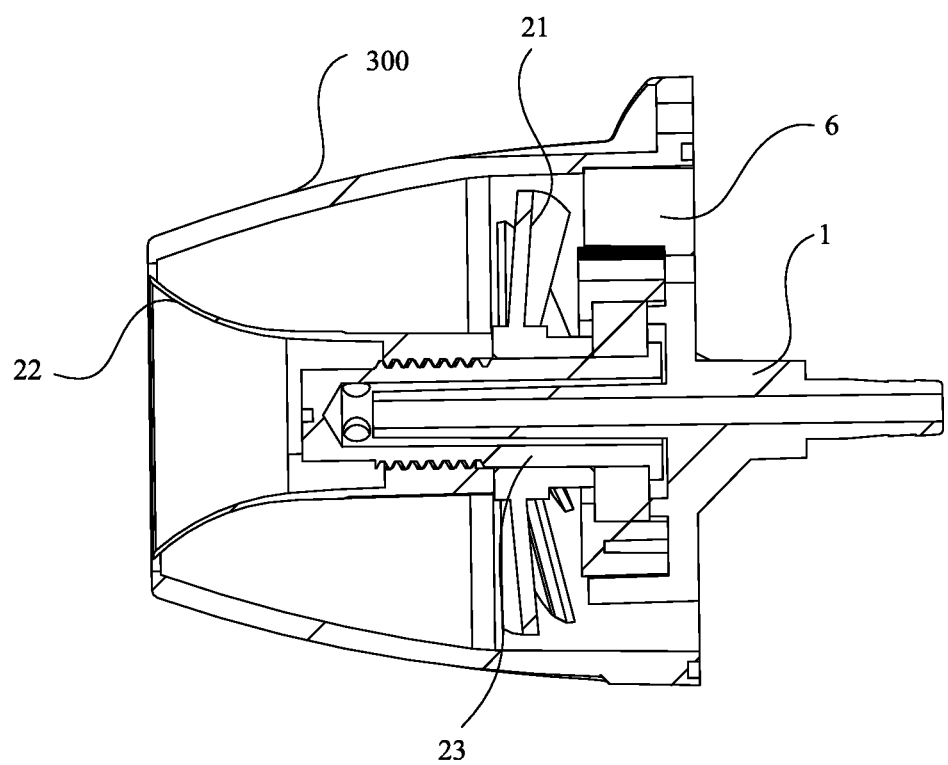

The present application provides a spray nozzle, comprising:

a transmission component; and
a fan blade assembly;
characterized in that the fan blade assembly is connected to the transmission component; the fan blade assembly rotates with respect to the transmission component to create a vacuum inside the fan blade assembly, so that a liquid to be atomized under atmospheric pressure enters the fan blade assembly through the transmission component; and the fan blade assembly drives the liquid in the fan blade assembly to rotate so as to atomize the liquid and eject it from the fan blade assembly.

In some embodiments, the fan blade assembly comprises a fan blade and a water outlet; the water outlet is connected to the fan blade; the water outlet is hollow; the transmission component passes through the fan blade and extends into the water outlet; the water outlet is rotatable with the fan blade to rotate with respect to the transmission component, so as to create a vacuum inside the water outlet, and thus the liquid enters the water outlet through the transmission component under atmospheric pressure; and the water outlet is able to drive the liquid in the water outlet to rotate so as to atomize the liquid and eject it from the water outlet.

In some embodiments, the fan blade assembly further comprises a connecting pipe; both of the fan blade and the water outlet are sleeved on the connecting pipe; the transmission component is inserted into an end of the connecting pipe; the fan blade rotates with respect to the transmission component to drive the water outlet to rotate via the connecting pipe; and the liquid is able to enter the water outlet through the transmission component and the connecting pipe under atmospheric pressure.

In some embodiments, an inner diameter of the water outlet is flared toward an end of the water outlet away from the fan blade.

In some embodiments, there is a gap between the transmission component and an inner wall of the connecting pipe.

In some embodiments, at least one first opening is provided on a side wall of the connecting pipe; and the first opening is configured to communicate an interior of the connecting pipe with an interior of the water outlet; and the liquid is able to enter the water outlet through the transmission component, the connecting pipe and the first opening under atmospheric pressure.

In some embodiments, a plurality of first openings spaced apart are provided on the side wall of the connecting pipe.

In some embodiments, an inner wall of the water outlet is provided with a first thread; an outer wall of the connecting pipe is provided with a second thread; and the first thread and the second thread are joined together to fixedly connect the water outlet and the connecting pipe.

In some embodiments, the spray nozzle further comprises a bearing sleeved on the fan blade assembly; and the fan blade assembly is rotatably connected to the transmission component through the bearing.

The present application further provides a sprayer, comprising:

a sprayer body; and the spray nozzle;

characterized in that the sprayer body is connected to the transmission component and is configured to accommodate the liquid to be atomized.

The technical solutions of the present application have the following advantages.

The fan blade assembly can rotate with respect to the transmission component to create a vacuum inside the fan blade assembly, so that the liquid in an outer container under atmospheric pressure can enter the fan blade assembly through the transmission component and then is atomized and ejected by rotating with the fan blade assembly. In the application, the liquid in the fan blade assembly rotates with the fan blade assembly, so that the liquid fully contacts with the inner wall of the fan blade assembly, which makes the liquid evenly distribute inside the spray nozzle, resulting in better liquid atomization.

BRIEF DESCRIPTION OF THE DRAWINGS

The accompanying drawings in the disclosure will be briefly described below to clearly illustrate the technical solutions of the present application. Obviously, the accompanying drawings are merely illustrative. Other drawings can be made by those skilled in the art based on the accompanying drawings without sparing any creative efforts.

FIG. 1 is an exploded view of a spray nozzle according to an embodiment;

FIG. 2 is a cross-sectional view of the spray nozzle according to an embodiment;

FIG. 3 is an axonometric view of the spray nozzle according to an embodiment;

FIG. 4 is an axonometric view of a sprayer according to an embodiment;

FIG. 5 is an axonometric view of a sprayer with a spray nozzle casing according to an embodiment;

FIG. 6 is a cross-sectional view of a sprayer provided with the spray nozzle casing according to an embodiment;

FIG. 7 is an axonometric view of the spray nozzle and an air blower according to an embodiment;

FIG. 8 is a cross-sectional view of the spray nozzle and the air blower according to an embodiment;

FIG. 9 schematically shows the cooperation between a bulge and a fixing assembly according to an embodiment; and FIG. 10 is a cross-sectional view of the spray nozzle and the spray nozzle casing according to an embodiment.

In the drawings: 1, transmission component; 11, first side surface; 12, first end surface; 13, first cavity; 2, fan blade assembly; 21, fan blade; 22, water outlet; 221, first thread; 23, connecting pipe; 231, second side surface; 232, second end surface; 233, second thread; 234, second cavity; 235, first opening; 3, bearing; 31, inner ring; 32, outer ring; 4, bearing locating part; 5, fastener; 6, extension part; 100, spray nozzle; 200, sprayer body; 210, air blower; 211, mesh structure; 220, sprayer casing; 230, container; 2301, third opening; 240, container lid; 250, case; 260, adjustment element; 261, second opening; 2611, first sub-opening; 2612, second sub-opening; 2613, third sub-opening; 262, first teeth; 300, spray nozzle casing; 400, fixing assembly; 410, elastic component; 420, fixing block; 421, second teeth; 500, separator; 600, handle; 700, switch button; and 800, valve switch.

The present application will be further described with reference to the embodiments and the accompanying drawings for the full illustration of the ends, functional features and advantages of the present application.

DETAILED DESCRIPTION OF EMBODIMENTS

The present application will be further described below with reference to the accompanying drawings in the embodiments to clearly and completely describe the technical solutions of the embodiments. Obviously, the embodiments disclosed herein are intended to be exemplary. Any other embodiments made by those skilled in the art based on the embodiments of the present application and without sparing any creative efforts shall fall within the scope of the present application.

It should be noted that all the terms (such as upper, lower, left, right, front, rear) that indicate directions in the embodiments are only used to explain the relative positions and movements of the components under a specific view (as shown in the drawings). The directional indications of these terms will accordingly change under different views. In addition, the descriptions relating to "first", "second" and the like in this application are merely illustrative, and are not intended to indicate or imply their relative importance or implicitly indicate the number of technical features. Therefore, the features defined by "first" and "second" may explicitly or implicitly include at least one of the features. Furthermore, the recitation "and/or" in the description includes three solutions, for example, the recitation "A and/or B" includes the technical solution A, the technical solution B and the technical incorporation of A and B. In addition, the technical solutions of various embodiments can be combined, but it is required that these combinations can be implemented by those of ordinary skill in the art. Otherwise, when there is conflict in the combination of technical solutions or it is impossible to combine the technical solution, the combination of the technical solutions is considered to be nonexistent and does not fall within the scope as defined by the appended claims.

Provided herein is a spray nozzle, which is specifically described as follows.

Figure 1:
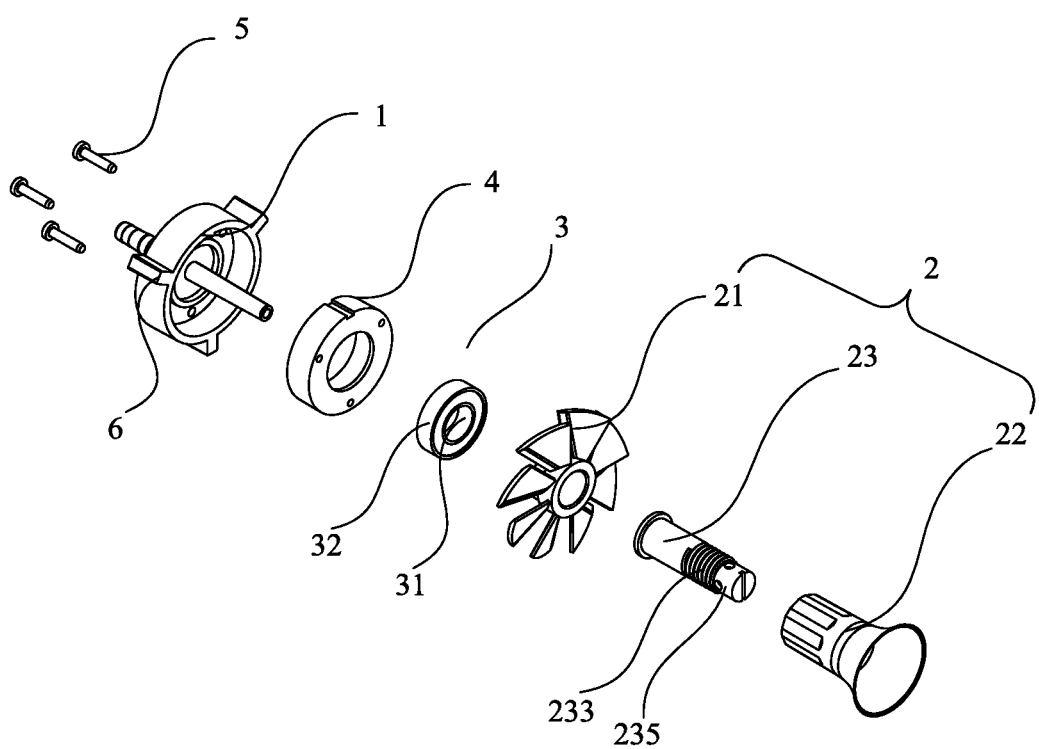

As shown in FIG. 1, a spray nozzle 100 in an embodiment includes a transmission component 1 and a fan blade assembly 2. The fan blade assembly 2 is connected to the transmission component 1. The fan blade assembly 2 can rotate with respect to the transmission component 1 to create a vacuum inside the fan blade assembly 2, so that a liquid to be atomized under atmospheric pressure can enter the fan blade assembly 2 through the transmission component 1. Further, the fan blade assembly 2 can drive the liquid in the fan blade assembly 2 to rotate so as to atomize the liquid and eject it from the fan blade assembly 2.

The fan blade assembly 2 can rotate with respect to the transmission component 1 to create a vacuum inside the fan blade assembly 2, so that the liquid under atmospheric pressure can enter the fan blade assembly 2 through the transmission component 1 and then be atomized and ejected by rotating with the fan blade assembly 2. In the present application, the liquid in the fan blade assembly 2 rotates together with the fan blade assembly 2 so that the liquid is uniformly distributed inside the fan blade assembly 2, thereby obtaining better liquid atomization.

As shown in FIGS. 1-2, the fan blade assembly 2 includes a fan blade 21 and a water outlet 22. The water outlet 22 is connected to the fan blade 21. The transmission component 1 passes through the fan blade 21 and extends into the water outlet 22. The water outlet 22 rotates together with the fan blade 21 with respect to the transmission component 1 to create a vacuum inside the water outlet 22, so that the liquid to be atomized under atmospheric pressure can enter the water outlet 22 through the transmission component 1. Further, the water outlet 22 can drive the liquid in the water outlet 22 to rotate so as to atomize the liquid and eject it from the water outlet 22.

The rotation of the fan blade 21 induces a force to blow the liquid sprayed from the water outlet 22, so that the liquid is further atomized and ejected farther.

The fan blade assembly 2 further includes a connecting pipe 23. Both of the fan blade 21 and the water outlet 22 are sleeved on the connecting pipe 23. The transmission component 1 is inserted into an end of the connecting pipe 23. The fan blade 21 can rotate with respect to the transmission component 1 to drive the water outlet 22 to rotate via the connecting pipe 23, and the liquid can enter the water outlet 22 through the transmission component 1 and the connecting pipe 23 under atmospheric pressure.

As shown in FIGS. 1-2, an inner diameter of the water outlet 22 is flared toward an end of the water outlet 22 away from the fan blade 21, which helps disperse the liquid in the water outlet 22 outward, making the liquid distribution more even and obtaining better liquid atomization. The water outlet 22 is not limited to be trumpet-shaped.

As shown in FIG. 2, there is a gap between the transmission component 1 and the connecting pipe 23. When the connecting pipe 23 rotates together with the fan blade 21 and the water outlet 22 with respect to the transmission component 1, the connecting pipe 23 does not directly contact the transmission component 1, so as to reduce the rotational resistance of the connecting pipe 23.

As shown in FIG. 2, in an embodiment, the transmission component 1 includes a first side surface 11 and a first end surface 12. The connecting pipe 23 includes a second side surface 231 oriented toward the first side surface 11 and a second end surface 232 oriented toward the first end surface 12. A first gap exists between the first end surface 12 and the second end surface 232. A second gap exists between the first side surface 11 and the second side surface 231. The first gap and the second gap together constitute a gap.

As shown in FIGS. 1-2, an inner wall of the water outlet 22 is provided with a first thread 221. An outer wall of the connecting pipe 23 is provided with a second thread 233. The first thread 221 and the second thread 233 are joined together to fixedly connect the water outlet 22 and the connecting pipe 23. Specifically, the first thread 221 is an internal thread, and the second thread 233 is an external thread.

Figure 2:
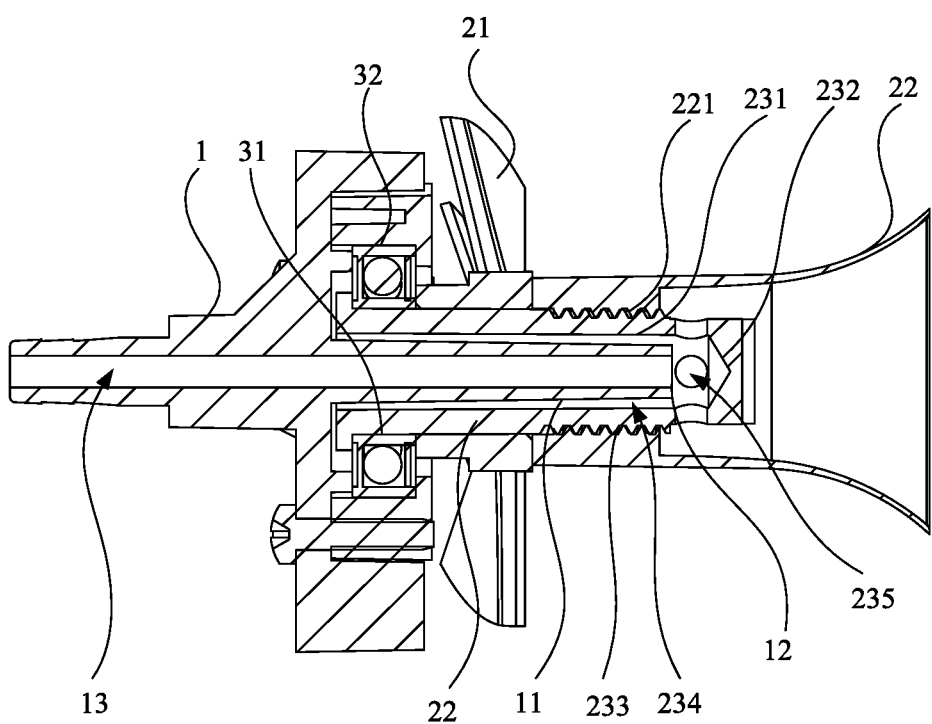

As shown in FIG. 2, the transmission component 1 includes a first cavity 13. The connecting pipe 23 includes a second cavity 234. The first cavity 13 is communicated with the second cavity 234. The second cavity 234 is communicated with an interior of the water outlet 22 so that the liquid can enter the water outlet 22 through the first cavity 13 and the second cavity 234. Specifically, the first cavity 13 is not limited to a cylinder. In the case that the first cavity 13 is cylindrical in shape, the liquid flows faster through the first cavity 13, and the load applied in the first cavity 13 is uniformly distributed. The second cavity 234 is not limited to a cylinder. In the case that the second cavity 234 is cylindrical in shape, the liquid flows faster through the second cavity 234, and the load applied in the second cavity 234 is uniformly distributed.

As shown in FIGS. 1-2, at least one first opening 235 is provided on a side wall of the connecting pipe 23. The first opening 235 is configured to communicate the second cavity 234 and the interior of the water outlet 22. The liquid can enter the water outlet 22 through the first cavity 13, the second cavity 234 and the first opening 235. Specifically, the first opening 235 is not limited to a circular opening.

In an embodiment, a plurality of first openings 235 spaced apart are provided on the side wall of the connecting pipe 23, which allows the liquid in the second cavity 234 to enter the water outlet 22 in different directions, and thus the liquid is more dispersed in the water outlet 22, enhancing liquid atomization. In the present embodiment, four first openings 235 spaced apart are provided on the side wall of the connecting pipe 23, which allows the liquid in the second cavity 234 to enter the water outlet in different directions. It should be understood that, in other embodiments, the number of the first openings 235 may be less than three or more than five, and the specific number may be selected reasonably according to actual conditions.

As shown in FIGS. 1-2, the spray nozzle 100 further includes a bearing 3 sleeved on the fan blade assembly 2. The bearing 3 is configured to support the fan blade assembly 2 that is rotatably connected to the transmission component 1 through the bearing 3. Specifically, the bearing 3 is sleeved on the connecting pipe 23. One end of the bearing 3 is in contact with the connecting pipe 23. The other end of the bearing 3 is in contact with an end of the fan blade 21 away from the water outlet 22. The fan blade 21 and the connecting pipe 23 together limit movement of the bearing 3 in an axial direction.

As shown in FIGS. 1-2, the spray nozzle 100 still further includes a bearing locating part 4 sleeved on the bearing 3. The bearing locating part 4 is configured to fix the bearing 3 and is connected to the transmission component 1. The fan blade assembly 2 is connected to the transmission component 1 via the bearing 3 and the bearing locating part 4.

As shown in FIGS. 1-2, the spray nozzle 100 further includes at least one fastener 5. The fastener 5 passes through the transmission component 1 to connect the bearing locating part 4. The bearing locating part 4 and the transmission component 1 are connected via the fastener 5. In an embodiment, there are a plurality of fasteners 5 spaced apart. The plurality of fasteners 5 pass through the transmission component 1 to connect the bearing locating part 4, so as to realize the reliable connection between the bearing locating part 4 and the transmission component 1. In the present embodiment, there are three fasteners 5 spaced apart.

The three fasteners 5 pass through the transmission component 1 to connect the bearing locating part 4. It should be understood that, in other embodiments, the number of the fasteners 5 may be less than two or more than four, and the specific number may be selected reasonably according to actual conditions. Specifically, the fasteners 5 is not limited to a screw.

As shown in FIGS. 1-2, the bearing 3 includes an inner ring 31 and an outer ring 32. The outer ring 32 is rotatably sleeved on the inner ring 31, and the inner ring 31 is sleeved on the connecting pipe 23. The bearing locating part 4 is sleeved on the outer ring 32. The rotation of the fan blade 21 drives the connection pipe 23 and the water outlet 22 to rotate, and the connection pipe 23 drives the inner ring 31 to rotate. Since the outer ring 32 does not rotate with the inner ring 31, the transmission component 1 that connects the bearing 3 via the bearing locating part 4 will not rotate with the inner ring 31. That is, when the fan blade assembly 2 that includes the fan blade 21, the connecting pipe 23 and the water outlet 22 rotates, the transmission component 1 does not follow the fan blade assembly 2 to rotate.

Figure 3:
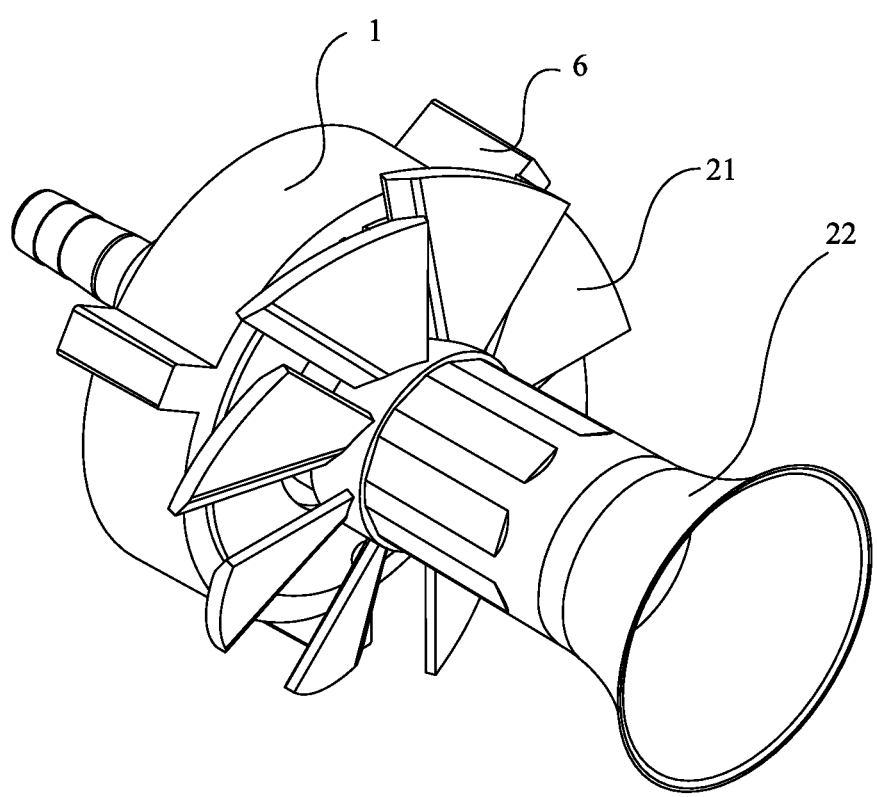
Figure 4:
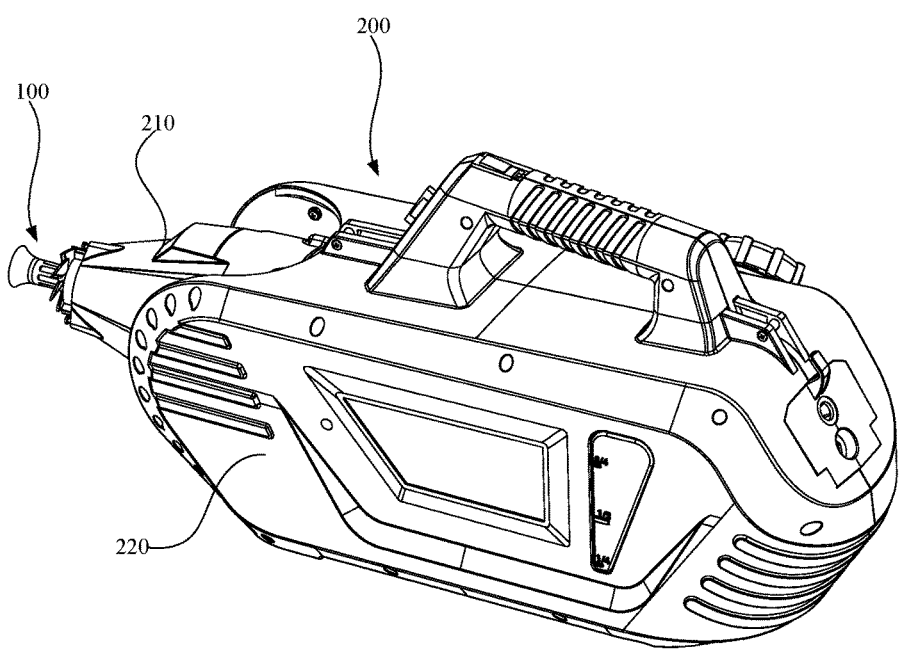

Referring to FIGS. 1-3, the operating principle of the spray nozzle 100 is described as follows.

An external driving device drives the fan blade assembly 2, so as to drive the water outlet 22 to rotate. The water outlet 22 rotates and thus creates a partial vacuum therein. Under atmospheric pressure, the liquid enters the water outlet 22 through the first cavity 13, the second cavity 234 and the first opening 235. The liquid in the water outlet 22 rotates with the water outlet 22 and then is atomized and ejected from the water outlet 22. The atomized liquid is subjected to fan blade-induced wind forces and thus is further atomized and ejected farther.

Provided herein is a sprayer, which is specifically described as follows.

As shown in FIGS. 2 and 4, the sprayer includes the spray nozzle 100 and a sprayer body 200. The sprayer body 200 is connected to the transmission component 1 and is configured to accommodate the liquid to be atomized.

The sprayer body 200 can drive the fan blade assembly 2 to rotate with respect to the transmission component 1, so as to create a vacuum inside the fan blade assembly 2, whereby the liquid in the sprayer body 200 under atmospheric pressure can enter the fan blade assembly 2 through the transmission component 1. The fan blade assembly 2 can also drive the liquid in the fan blade assembly 2 to rotate so as to atomize the liquid and eject it from the fan blade assembly 2.

As shown in FIG. 2 and FIG. 4, the sprayer body 200 includes an air blower 210 and a sprayer casing 220. One end of the air blower 210 is connected to the sprayer casing 220, and the other end of the air blower 210 is connected to the transmission component 1. The sprayer casing 220 is used to accommodate the liquid. The air blower 210 can drive the fan blade assembly 2 to rotate with respect to the transmission component 1, so as to create a vacuum inside the fan blade assembly 2, whereby the liquid in the sprayer under atmospheric pressure casing 220 can enter the fan blade assembly 2 through the transmission component 1. The fan blade assembly 2 can also drive the liquid in the fan blade assembly 2 to rotate so as to atomize the liquid and eject it from the fan blade assembly 2.

The air blower 210 is rotatable with respect to the sprayer casing 220 to adjust an angle of the air blower 210 with respect to the sprayer casing 220, so as to adjust an angle of the spray nozzle 100 connected to the air blower 210 with respect to the sprayer casing 220. Specifically, by adjusting an angle of the spray nozzle 100 with respect to the sprayer casing 220, different spray angles can be achieved without moving the whole sprayer, widening the spray angle and facilitating the use of the sprayer.

Figure 7:
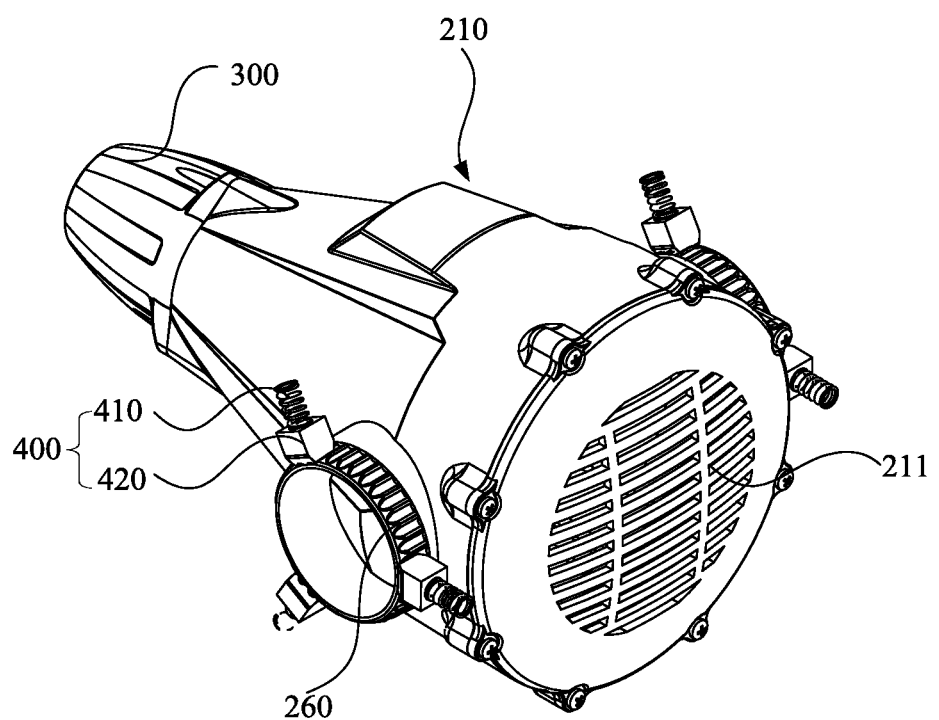

As shown in FIG. 7, a mesh structure 211 is provided on a side of the air blower 210 that faces the sprayer casing 220. Specifically, the mesh structure 211 is used to communicate the air blower 210 and external environment. External air can enter the air blower 210 through the mesh structure 211. Moreover, the mesh structure 211 can prevent large-sized objects from entering the air blower 210 to ensure the normal operation of the air blower.

Figure 5:
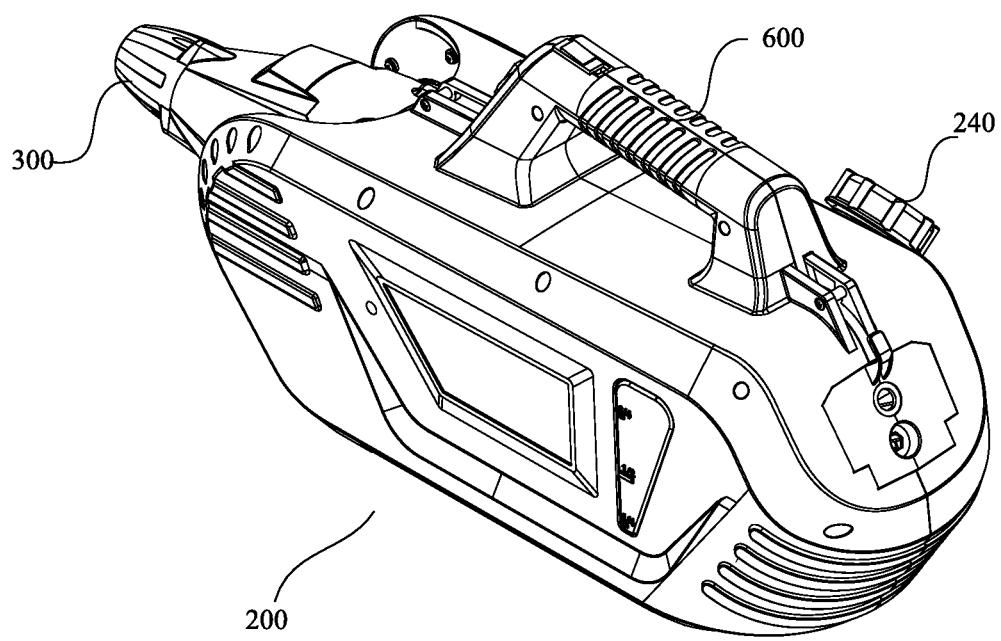
Figure 6:
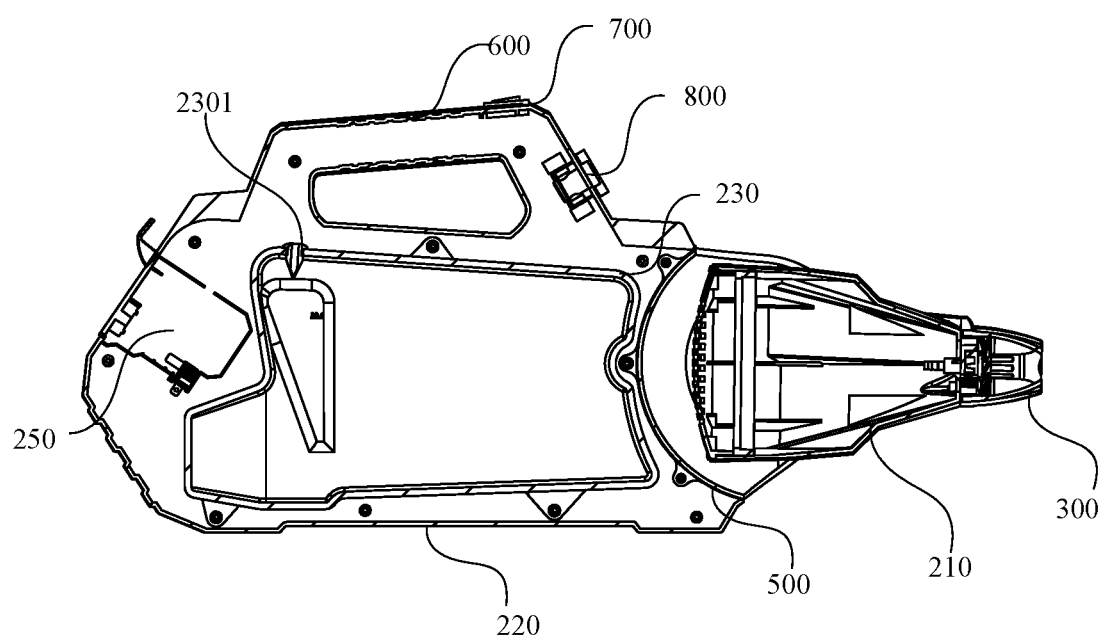

As shown in FIGS. 5-6, the sprayer 200 further includes a spray nozzle casing 300. The spray nozzle 100 is arranged in the spray nozzle casing 300 that is connected to the sprayer casing 220.

As shown in FIG. 1 and FIG. 10, the spray nozzle 100 also includes at least one extension part 6 provided on an outer wall of the transmission component 1. The transmission component 1 is connected to the spray nozzle casing 300 via the extension part 6. In an embodiment, a plurality of extension parts 6 spaced apart are provided on the outer wall of the transmission component 1, which makes the connection between the transmission component 1 and the spray nozzle casing 300 more reliable. In this embodiment, three extension parts 6 spaced apart are arranged on the outer wall of the transmission component 1. It should be understood that, in other embodiments, the number of the extension parts 6 may be less than two or more than four, and the specific number may be selected reasonably according to actual conditions.

As shown in FIG. 6, the sprayer body 200 also includes a container 230 provided in the sprayer casing 220 to accommodate the liquid. Specifically, the container 230 partially protrudes from the sprayer casing 220. A part of the container 230 that protrudes from the sprayer casing 220 is provided with an opening that communicates with an interior of the container 230. In this way, the liquid can be injected into the container 230 from the opening.

The sprayer body 200 further includes a container lid 240 provided at the opening of the container 230. Specifically, after the liquid is injected into the container 230, the container lid 240 covers the opening of the container 230 to prevent splashing when the sprayer is in use and prevent contamination from entering the container 230.

The sprayer body 200 still further includes a power supply provided in the sprayer casing 220. The power supply is electrically connected to the air blower 210 for energy supply.

As shown in FIG. 6, the sprayer body 200 yet further includes a case 250 provided in the sprayer casing 220 to accommodate the power supply. The case 250 and the container 230 spaced apart are provided. Specifically, the case 250 is provided to separate the power supply and the liquid in the container 230, so as to avoid electrical short circuit, thereby improving the safety of the power supply.

The sprayer body 200 also includes wires, by which the power supply is electrically connected to the air blower 210.

The sprayer also includes a first tubular component. An end of the first tubular component is connected to the transmission component 1, and the other end of the first tubular component is inserted into the sprayer casing 220. The liquid in the sprayer casing 220 can enter the fan blade assembly 2 through the first tubular component and the transmission component 1.

The sprayer further includes a second tubular component. An end of the second tubular component is inserted into the air blower 210, and the other end of the second tubular component is inserted into the container 230. The second tubular component is used to pass the wind pressure generated by the air blower 210 into the container 230, so as to result in a greater pressure in the container 230. On the one hand, the water outlet 22 rotates with respect to the transmission component 1 to create a vacuum inside the water outlet 22, so that the liquid to be atomized under atmospheric pressure can enter the water outlet 22 through the transmission component 1. On the other hand, the second tubular component is used to pass the wind pressure generated by the air blower 210 into the container 230, so as to result in a greater pressure in the container 230, whereby the liquid in the container 230 flows into the fan blade assembly 2 more quickly.

As shown in FIGS. 6-7, the sprayer body 200 also includes at least one adjustment element 260. The air blower 210 is connected to the sprayer casing 220 via the adjustment element 260. The adjustment element 260 is rotatable with respect to the sprayer casing 220 to adjust an angle of the air blower 210 with respect to the sprayer casing 220, so as to adjust an angle of the spray nozzle 100 connected to the air blower 210 with respect to the sprayer casing 220. Specifically, the adjustment element 260 is cylindrical.

Figure 8:
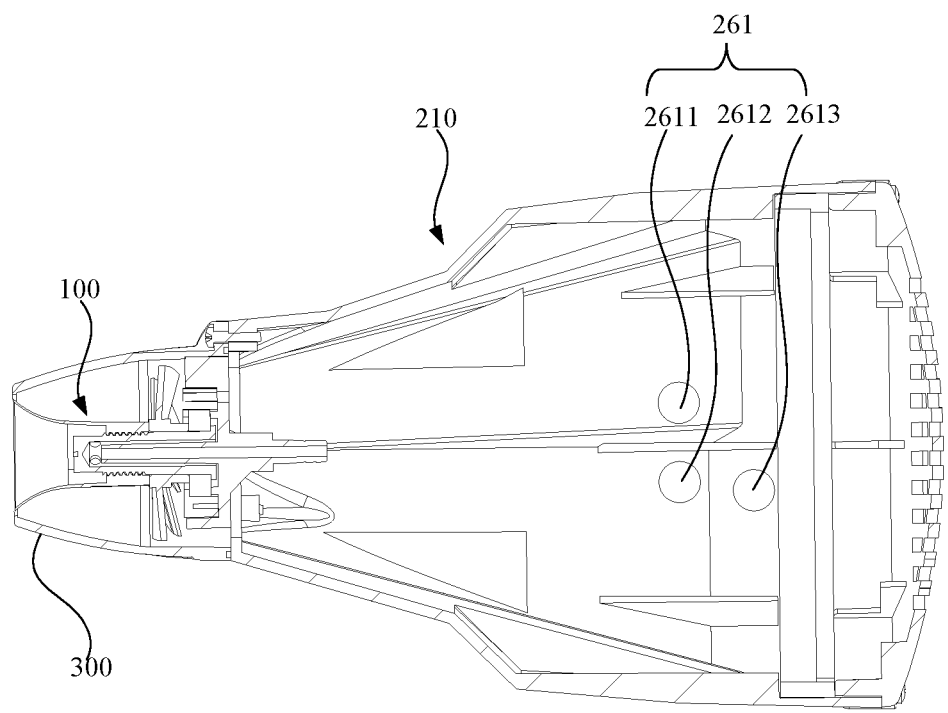

As shown in FIGS. 7-8, in an embodiment, a plurality of adjustment elements 260 spaced apart are provided on the air blower 210, which makes the connection between the air blower 210 and the sprayer casing 220 more reliable. In the present embodiment, two adjustment elements 260 spaced apart are provided on the air blower 210. It should be understood that, in other embodiments, the number of adjustment elements 260 may be more than three, and the specific number may be selected reasonably according to actual conditions.

The adjustment element 260 is provided with a second opening 261 configured to allow at least one of the first tubular component, the second tubular component and the wires to extend into the sprayer casing 220.

In the present embodiment, the second opening 261 includes a first sub-opening 2611, a second sub-opening 2612 and a third sub-opening 2613, which are spaced apart and provided on the adjustment element 260. The first tubular component passes through the first sub-opening 2611 to realize the connection between the transmission component 1 and the sprayer casing 220. The second tubular component passes through the second sub-opening 2612 to realize the connection between the air blower 210 and the sprayer casing 220. The wires pass through the third sub-opening 2613 to realize the electrical connection between the power supply and the air blower 210. Specifically, the first sub-opening 2611, the second sub-opening 2612 and the third sub-opening 2613 are used to prevent the mutual interference among the first tubular component, the second tubular component and the wires.

The container 230 is provided with two third openings 2301. The first tubular component passes through the first sub-opening 2611 and one of the two third openings 2301 to realize the connection between the transmission component 1 and the sprayer casing 220. The second tubular component passes through the second sub-opening 2612 and the other of the two third openings 2301 to realize the connection between the air blower 210 and the sprayer casing 220.

As shown in FIG. 7, the sprayer still further includes a fixing assembly 400 for fixedly connecting the sprayer casing 220 and the adjustment element 260.

As shown in FIG. 7, the fixing assembly 400 includes an elastic component 410 and a fixing block 420. An end of the elastic component 410 is connected to the sprayer casing 220, and the other end of the elastic component 410 is connected to the fixing block 420. The fixing block 420 is connected to the adjustment element 260 that can rotate with respect to the fixing block 420. The fixing block 420 can engage with different positions of an outer circumference of the adjustment element 260. The elastic component 410 is used to provide an elastic force to engage the fixing block 420 with the adjustment element 260. Specifically, the elastic component 410 is not limited to a spring.

The elastic component 410 is compressed in an initial state and is able to provide the elastic force to engage the fixing block 420 with the adjustment element 260. The fixing block 420 is engaged with a first position of the adjustment element 260, so that the air blower 210 is positioned at a first angle with respect to the sprayer casing 220. When the angle of the spray nozzle 100 with respect to the sprayer casing 220 needs to be adjusted, an external force is applied to the spray nozzle 100 or the air blower 210 to drive the spray nozzle 100 and the air blower 210 to rotate together with respect to the sprayer casing 220. At this time, the elastic force of the elastic component 410 is offset by the external force, and the adjustment element 260 is separated from the fixing block 420 and rotates with respect to the fixing block 420. At this time, the elastic component 410 is further compressed. When the spray nozzle 100 and the air blower 210 are rotated to a required second angle with respect to the sprayer casing 220, the external force exerted on the spray nozzle 100 or the air blower 210 is removed. At this time, the elastic component 410 is elastically reset. The fixing block 420 is engaged with a second position of the adjustment element 260 under the elastic force of the elastic component 410, thereby positioning the spray nozzle 100 and the air blower 210 at the second position with respect to the sprayer casing 220.

It should be noted that, one end of the elastic component 410 is fixedly connected to the sprayer casing 220, and the other end of the elastic component 410 is fixedly connected to the fixing block 420. Therefore, when the adjustment element 260 rotates with respect to the fixing block 420, the fixing block 420 does not follow the rotation of the adjustment element 260.

As shown in FIGS. 6-7 and FIG. 9, a plurality of first teeth 262 spaced apart are provided on the outer circumference of the adjustment element 260, and a plurality of second teeth 421 spaced apart are provided on a side of the fixing block 420 which faces the adjustment element 260. The second teeth 421 can be engaged with different positions of the first teeth 262 to realize the engagement of the adjustment element 260 and the outer circumference of the fixing block 420 at different positions.

As shown in FIG. 6, the sprayer further includes a separator 500 provided between the sprayer casing 220 and the air blower 210. The separator 500 is used to separate the sprayer casing 220 and the air blower 210.

As shown in FIGS. 5-6, the sprayer yet further includes a handle 600 provided on the sprayer casing 220. The handle 600 helps to transfer the sprayer from one place to another.

As shown in FIG. 6, the sprayer also includes a switch button 700 provided on the sprayer casing 220. The switch button 700 is used to control the start and stop of the air blower 210. Specifically, the switch button 700 is arranged on the handle 600.

As shown in FIG. 6, the sprayer also includes a valve switch 800 provided on the sprayer casing 220. The valve switch 800 is used to control the on and off of the first tubular component. Specifically, the valve switch 800 is arranged on the handle 600. The valve switch 800 and the switch button 700 are spaced apart. When the sprayer stops working, the valve switch 800 is closed to disconnect the first tubular component, thereby stopping the liquid in the container 230 from entering the fan blade assembly 2 and dripping out from the fan blade assembly 2.

Referring to FIG. 2 and FIGS. 4-9, the operating principle of the sprayer is described as follows.

The valve switch 800 is turned on to make the first tubular component communicated. The switch button 700 is turned on to start the air blower 210. The air blower 210 can drive the fan blade assembly 2 to rotate to create a vacuum inside the fan blade assembly 2. The liquid in the container 230 can enter the fan blade assembly 2 through the first tubular component under atmospheric pressure. The liquid in the fan blade assembly 2 follows the fan blade assembly 2 to rotate so as to atomize the liquid and eject it from the fan blade assembly 2. The air blower 210 further atomizes the liquid sprayed from the fan blade assembly 2 and makes the atomized liquid be ejected farther. When the sprayer is in use, the spray nozzle 100 or the air blower 210 is rotated as needed, so that the spray nozzle 100 and the air blower 210 that are connected can rotate together with respect to the sprayer casing 220, thereby adjusting the angle of the spray nozzle 100 relative to the sprayer casing 220. When the sprayer is not needed, the switch button 700 is turned off, and the air blower 210 stops working. The valve switch 800 is rotated to make the first tubular member disconnected.

The above are merely the preferred embodiments of the present application, which are not intended to limit the scope of the invention. Any replacements based on the description and the accompanying drawings without departing from the spirit of the invention shall fall within the scope as defined by the appended claims.

What is claimed is:

1. A spray nozzle, consisting of:
    a fan blade, a connecting pipe, a water outlet, a transmission pipe, a cap-shaped member and a bearing which are concentrically arranged;
    wherein the water outlet has two ends consisting of a first end away from the fan blade and a second end close to the fan blade; the water outlet is hollow and flared toward the first end of the water outlet;
    the connecting pipe has two ends consisting of a first end and a second end; the first end of the connecting pipe is fixedly connected to the second end of the water outlet to impart rotation to the water outlet the connecting pipe comprises a tubular passage therein through which the transmission pipe passes;
    the transmission pipe is configured to pass through a center of the cap-shaped member, and to pass through the tubular passage of the connecting pipe, and to extend into the water outlet; and
    the fan blade comprises a central hole through which the connecting pipe passes; the fan blade is rotatable around an axial direction of the connecting pipe and is configured to drive the connecting pipe and the water outlet to rotate around the axial direction of the connecting pipe, so as to create a vacuum inside the water outlet for allowing a liquid to enter, under atmospheric pressure, the water outlet through the transmission pipe; and the water outlet is configured to drive the liquid in the water outlet to rotate so as to atomize the liquid and eject the liquid off the water outlet.

2. The spray nozzle of claim 1, wherein there is a gap between the transmission pipe and an inner wall of the connecting pipe.

3. The spray nozzle of claim 1, wherein at least one first opening is provided on a side wall of the connecting pipe; and the first opening is configured to communicate an interior of the connecting pipe with an interior of the water outlet; and the liquid under atmospheric pressure enters the water outlet through the transmission pipe, the connecting pipe and the first opening.

4. The spray nozzle of claim 3, wherein the at least one first opening consists of a plurality of first openings that are spacedly provided on the side wall of the connecting pipe.

5. The spray nozzle of claim 1, wherein an inner wall of the water outlet is provided with a first thread; an outer wall of the connecting pipe is provided with a second thread; and the first thread and the second thread are joined together to fixedly connect the water outlet and the connecting pipe.

6. The spray nozzle of claim 1, wherein the bearing is sleeved on the connecting pipe; and the fan blade is rotatably connected to the cap-shaped member through the bearing.

7. A sprayer, comprising:
   a sprayer body; and
   the spray nozzle of claim 1;
   wherein the sprayer body is connected to the cap-shaped member and is configured to accommodate the liquid to be atomized.

* * * * *